Nov. 9, 1937.   E. R. KENYON   2,098,726
CULTIVATOR
Filed May 13, 1937   2 Sheets-Sheet 1
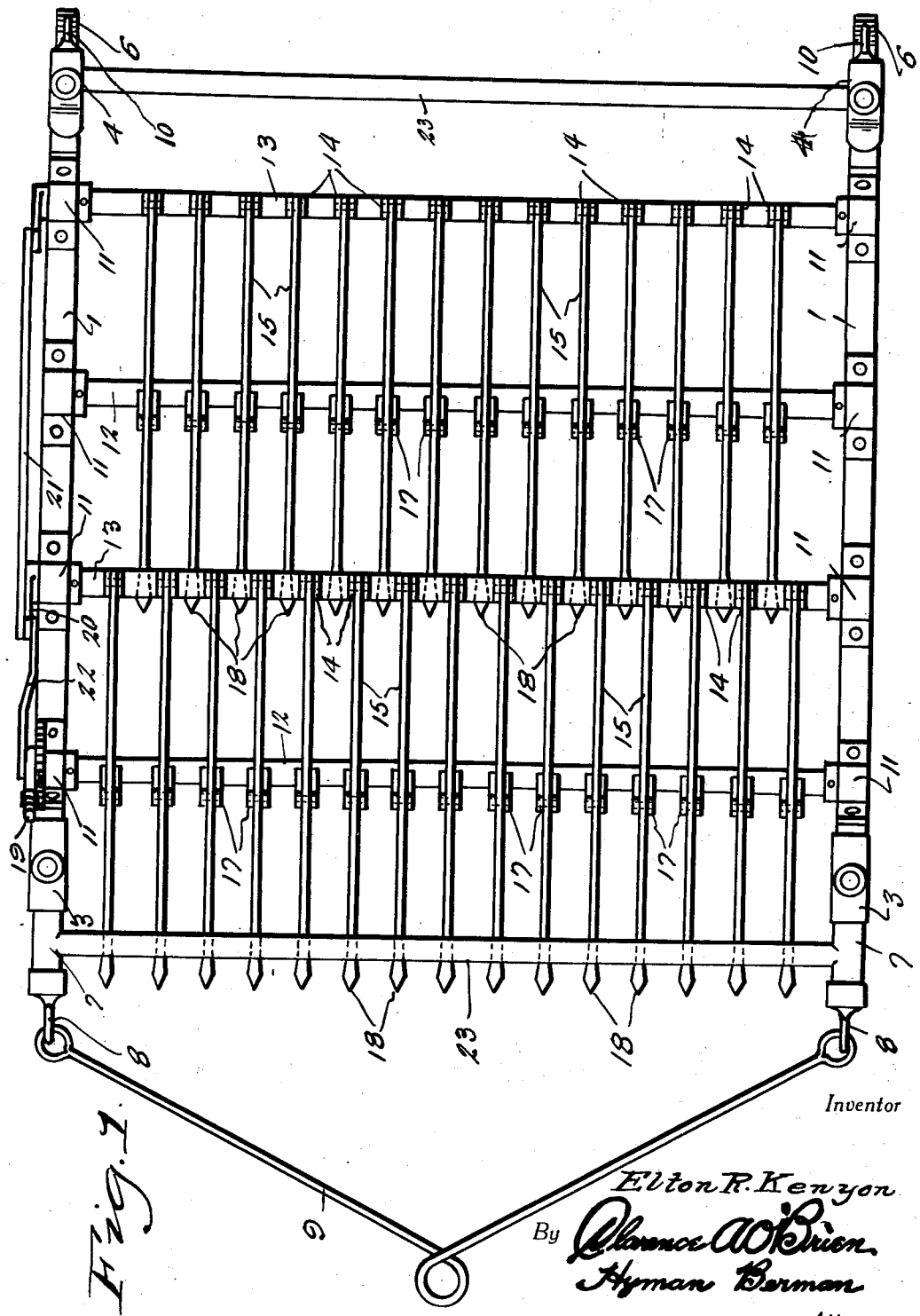
Inventor
Elton R. Kenyon
By Clarence A. O'Brien
Hyman Berman
Attorneys Nov. 9, 1937.  E. R. KENYON  2,098,726
CULTIVATOR
Filed May 13, 1937  2 Sheets-Sheet 2
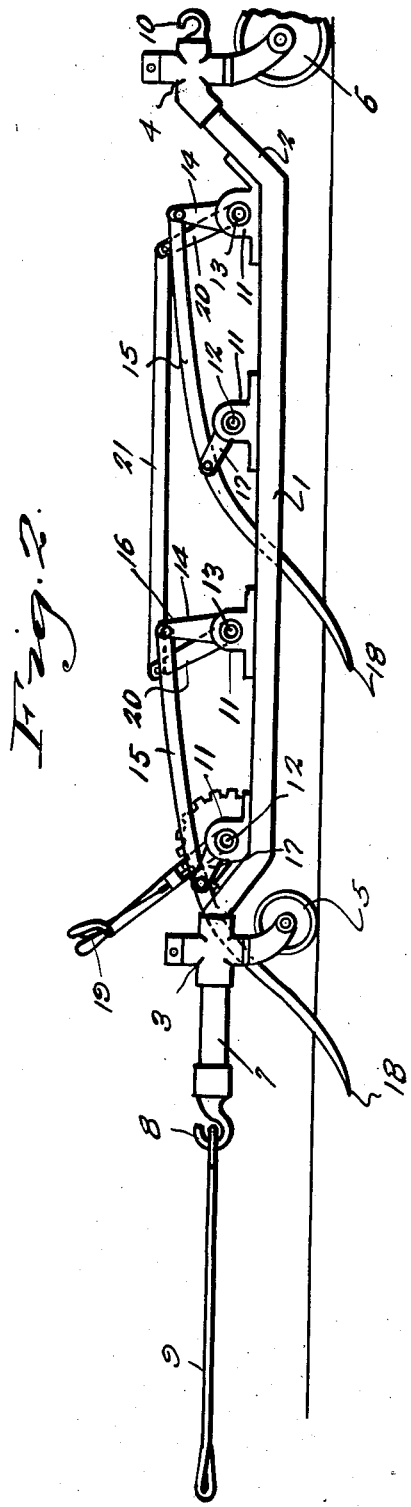
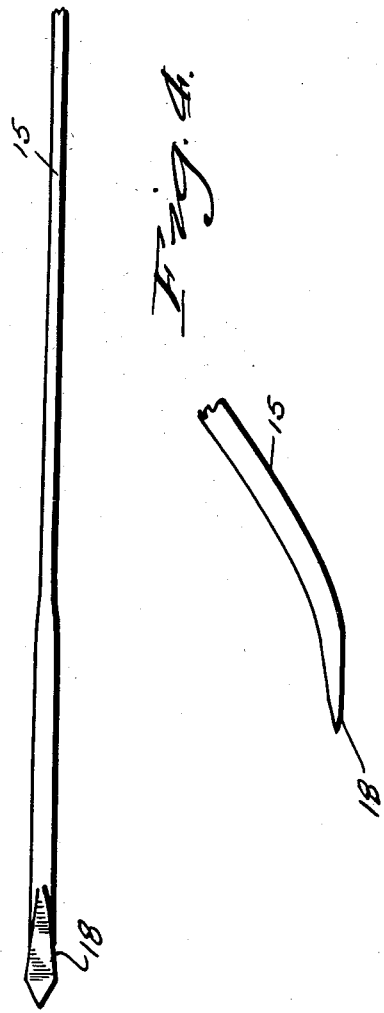
Inventor
Elton R. Kenyon
By Clarence A. O'Brien
Hyman Berman
Attorneys Patented Nov. 9, 1937

2,098,726

UNITED STATES PATENT OFFICE 2,098,726

CULTIVATOR

Elton R. Kenyon, Geneseo, Kans.

Application May 13, 1937, Serial No. 142,486

5 Claims. (Cl. 55—102)

The present invention relates to new and useful improvements in cultivators for use particularly in what has come to be known as the "dust bowl" region of the United States and has for its primary object to provide, in a manner as hereinafter set forth, an implement of this character embodying a novel construction and arrangement of teeth whereby the soil will be treated in a manner to substantially prevent or materially reduce erosion by wind and water, particularly the former.

Another very important object of the invention is to provide a cultivator of the aforementioned character embodying novel means for adjusting the teeth.

Other objects of the invention are to provide a cultivator of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a cultivator constructed in accordance with the present invention.

Figure 2 is a view in side elevation thereof.

Figure 3 is a plan view of one of the teeth.

Figure 4 is a view in side elevation of the forward end portion of one of the teeth.

Referring now to the drawings in detail, it will be seen that the embodiment of the invention which has been illustrated comprises a pair of side bars 1 having upturned end portions 2 on which four way fittings 3 and 4 are fixed. Journaled in the fittings 3 and 4 are front and rear caster wheels 5 and 6, respectively. Extensions 7 project forwardly from the front fittings 3 and have mounted on their free ends hooks 8 for connecting a suitable hitch 9 to the implement. Hooks 10 project rearwardly from the fittings 4 to permit a hitch to be connected to the rear end of the implement for drawing said implement backward.

Bearings 11 are mounted at longitudinally spaced points on the side bars 1 and journalled therein are pairs of spaced, parallel transverse shafts 12 and 13. Fixed on the shafts 13 are upstanding arms 14 to which the rear end portions of forwardly and downwardly directed teeth 15 are pivotally connected, as at 16. Arms 17 are fixed on the shafts 12 and pivotally connected to the teeth 15 at an intermediate point for supporting the forward ends of said teeth. It will thus be seen that two rows of teeth have been provided and, as illustrated to advantage in Fig. 1 of the drawings, said rows of teeth are staggered. The teeth 15 are curved downwardly and then forwardly and terminate in flattened points 18 which are adapted to penetrate and travel through the soil with a minimum application of power.

Fixed on one end portion of the forward shaft 12 is a hand lever 19. Arms 20 are fixed on the corresponding ends of the shafts 13 and connected by a link 21 for operation in unison. A link 22 (see Fig. 1) operatively connects the hand lever 19 to the forward arm 20.

It is thought that the operation of the cultivator will be readily apparent from a consideration of the foregoing. As the implement travels over the ground the teeth 15, moving through the ground at the desired depth, pitch up the heavy trash and scatter it as mulching and at the same time work the clods and lumps to the surface, leaving the fine soil below where it is protected from the wind and where it may retain moisture. Through the medium of the hand lever 19 the teeth 15 may be conveniently adjusted as desired or raised out of contact with the ground. When the shafts 13 are rocked in either direction to raise or lower the teeth, said teeth swing on the supporting arms 17 on the shafts 12. The caster wheels 5 and 6 permit the implement to negotiate turns without sliding. While two rows of teeth have been shown the cultivator may comprise any desired number of rows. Cross members 23 extend between the extensions 7 and between the rear fittings 4.

It is believed that the many advantages of a cultivator constructed in accordance with the present invention will be readily understood and although a preferred embodiment of the implement is as illustrated and described, it is to be understood that changes in the details of construction and in the combination and arrangement of parts may be resorted to which will fall within the scope of the invention as claimed.

What is claimed is:—

1. A cultivator comprising a pair of side bars, supporting wheels for said side bars, a pair of transverse shafts rockably mounted on the side bars, arms fixed to one of said shafts, teeth pivotally connected, at one end, to said arms and extending forwardly and downwardly therefrom, and arms fixed on the other shaft and pivotally connected to the teeth at an intermediate point.

2. A cultivator comprising a pair of side bars, supporting wheels for said side bars, a pair of spaced, parallel, transverse shafts rockably mounted on the side bars, upstanding arms fixed on one of said shafts, teeth pivotally connected, at their rear ends, to said arms, said teeth extending forwardly from the arms over the other shaft and then downwardly, arms fixed on said other shaft and pivotally connected to the teeth at an intermediate point, and means for rocking the shafts for raising and lowering the teeth.

3. A cultivator comprising a pair of side bars, supporting wheels for said side bars, a pair of spaced, parallel, transverse shafts rockably mounted on the side bars, upstanding arms fixed on one of said shafts, teeth pivotally connected, at their rear ends, to said arms, said teeth extending forwardly from the arms over the other shaft and then downwardly, arms fixed on said other shaft and pivotally connected to the teeth at an intermediate point, and means for rocking the shafts for raising and lowering the teeth, said means including a hand lever fixed on said other shaft, an arm fixed on said one shaft, and a link operatively connecting the last named arm to the hand lever for actuation thereby.

4. A cultivator comprising a pair of side bars including upwardly inclined end portions, four way fittings fixed on the ends of the side bars, caster wheels journalled for swinging movement in the fittings for supporting the side bars, extensions projecting forwardly from the front fittings, hooks on the free ends of said extensions for connection with a hitch, hooks projecting rearwardly from the rear fittings for connection with a hitch, pairs of spaced, parallel, transverse shafts rockably mounted on the side bars, arms fixed on certain of the shafts and rising therefrom, teeth pivotally connected, at one end, to said arms and extending forwardly therefrom over the other shafts and then downwardly, arms fixed on said other shafts and pivotally connected to the teeth at an intermediate point, and means for rocking the shafts for raising and lowering the teeth.

5. A cultivator comprising a pair of side bars including upwardly inclined end portions, four way fittings fixed on the ends of the side bars, caster wheels journalled for swinging movement in the fittings for supporting the side bars, extensions projecting forwardly from the front fittings, hooks on the free ends of said extensions for connection with a hitch, hooks projecting rearwardly from the rear fittings for connection with a hitch, pairs of spaced, parallel, transverse shafts rockably mounted on the side bars, arms fixed on certain of the shafts and rising therefrom, teeth pivotally connected, at one end, to said arms and extending forwardly therefrom over the other shafts and then downwardly, arms fixed on said other shafts and pivotally connected to the teeth at an intermediate point, and means for rocking the shafts for raising and lowering the teeth, said means including arms fixed on one end portion of said certain shafts, a link operatively connecting the last named arms, a hand lever fixed on one of said other shafts, and a link operatively connecting said hand lever to one of the last named arms.

ELTON R. KENYON.